(No Model.)

J. J. DOSSERT.
SHUTTER FOR PHOTOGRAPHIC CAMERAS.

No. 423,913. Patented Mar. 25, 1890.

Attest:
A. N. Jesbera.
E. M. Watson.

Inventor:
John J. Dossert
By David A. Burr
Atty.

UNITED STATES PATENT OFFICE.

JOHN J. DOSSERT, OF NEW YORK, N. Y.

SHUTTER FOR PHOTOGRAPHIC CAMERAS.

SPECIFICATION forming part of Letters Patent No. 423,913, dated March 25, 1890.

Application filed September 7, 1889. Serial No. 323,293. (No model.)

*To all whom it may concern:*

Be it known that I, JOHN J. DOSSERT, of the city, county, and State of New York, have invented certain new and useful Improvements in Shutters for Photographic Cameras; and I do hereby declare that the following is a full and exact description thereof, reference being had to the accompanying drawings, and to the letters of reference marked thereon, making a part of this specification.

This invention relates to devices for controlling the movements of the shutters in a photographic camera, and has for its object to simplify the same and to facilitate the adjustment thereof for both time and instantaneous exposures.

It consists in the combination, with a pair of shutters traversing the lens-opening in the camera, of a novel system of adjusting, restraining, and releasing devices, as hereinafter described and claimed.

Figure 1:
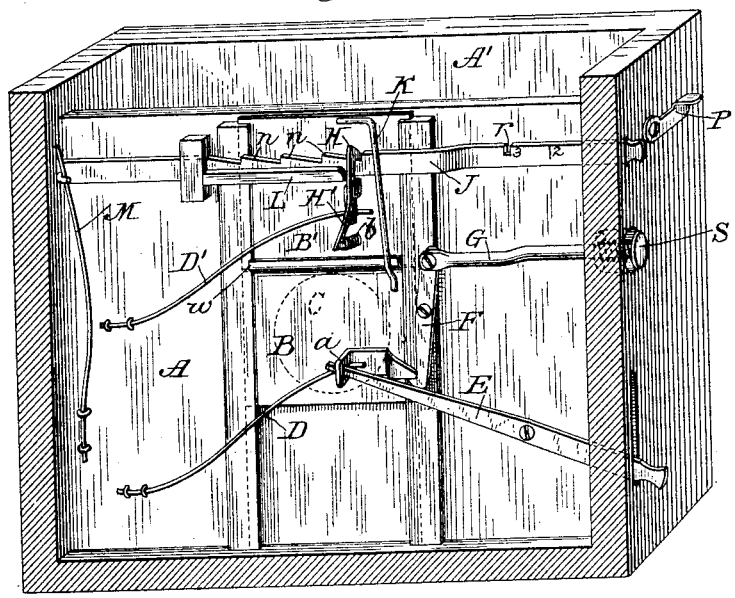
Figure 2:
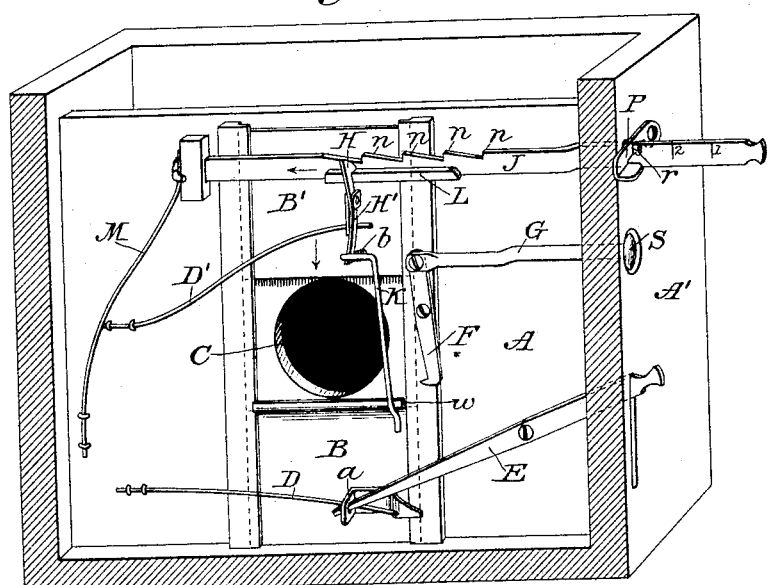

In the accompanying drawings, Figure 1 is a view in perspective of a shutter-board fitted in a camera-box back of its lens-aperture and having my improved devices applied thereto; and Fig. 2 is a similar view of the same, illustrating the position of the parts with the lower shutter open and the upper shutter positively held for a time-exposure.

A is the board or partition to carry the shutter by which the lens-opening in the camera A' is closed. C is the shutter-opening in said board, and B B' are the shutters. These shutters are fitted in suitable ways to slide independently one after the other over said opening in such manner as that, when in contact one against the other, one or the other of them will cover the opening, as shown in Fig. 1, while they admit of being separated far enough to admit of leaving the opening wholly uncovered between them, as shown in Fig. 2.

The edge of one of the shutters B is made to overlap the proximate edge of the other shutter B' at w, so that when they are closed together the joint between them will be light-proof.

The shutters may be fitted to slide to any position across the opening, but are preferably made to traverse it vertically.

The lower shutter B is carried to its normal position of rest below the opening C by gravity and by the stress of a spring D fitted thereto. The upper shutter B' is in like manner caused to drop by its weight, aided by the stress of a second spring D', and to rest normally upon the upper edge of the lower shutter.

When the two shutters are both lowered, the opening is covered by the upper shutter. When they are both raised together, the opening is closed by the lower shutter. If the latter be dropped independently of the first, so as to leave an interval between the two, the opening is thereby uncovered.

The lower shutter B is lifted (and with it the upper shutter if depressed) by means of a setting-lever E, pivoted to the shutter-board, so that its inner end shall engage an ear *a* on the shutter and its outer end project outward through the case of the camera within reach of the operator's finger. When lifted, the shutter is automatically caught and held by a swinging catch F, pivoted at one side thereof above the setting-lever E, and this catch is oscillated and is released from engagement with the shutter by means of a push-rod G, pivoted thereto, and which, extending outward through the casing of the camera, terminates in a button S.

The upper shutter B', when lifted, is upheld by a spring-actuated vertical hook H, pivoted against the face of the shutter to engage automatically the upper edge of a horizontal bar J, sliding transversely across the inner face of the shutter independently thereof in suitable bearings on the shutter-board A, and whose outer end is made to project outwardly through the casing above the end of the releasing-rod G. The lower arm H' of the pivoted hook-lever is bent outward, as shown in the drawings, and is normally held in its outward position, so as to carry the opposite hooked end into engagement with the transverse bar J by the stress of a coiled spring *b* placed under it.

A tripping-rod K is secured to the lower shutter to project upward therefrom alongside of and parallel with the hook-lever, and its upper end is bent, so that when the lower shutter drops the end of the rod will bear upon the outwardly-inclined lower arm H' of the hook-lever before the movement of the shutter is fully completed and so far rock the lever as to disengage its hook H from the edge of the bar J. A longitudinal offset L is formed upon the face of the bar J by means of a strip secured thereto parallel with its upper edge, a slight distance below it, this offset or retarding-strip L being so adjusted in length as that when the bar J is pushed fully inward the end of the strip will not be in line with the hook H, so that the latter when released from the edge of the bar will drop clear of the strip L, and, passing it, will allow the shutter to fall quickly under the influence of its weight and spring. If, however, the bar J be drawn outward more or less, the hook H, when disengaged, will in dropping from the upper edge of the bar be caught upon the strip and there held. The bar J is normally drawn inward, so as to leave the hook H beyond and clear of the retarding-strip L by the stress of a spring M engaging its inner end. Its upper edge is, however, notched to form a rack, as at $n\ n$, above the strip L, so that after the hook H, by the lifting of the shutters B and B' is made to rest thereon the bar may be drawn outwardly more or less to bring the strip under the hook, and when drawn out will be automatically held against the stress of its spring M by the engagement of the hook with said notches. If, now, the hook H be released from the notched edge $n\ n$, it will drop upon and be held by the strip L; but, since by the disengagement of the hook from the notched edge of the bar the bar is left free to be drawn inward by its spring, it will so move, and thereby draw the strip from under the hook, which, being then left unsupported, will allow the upper shutter B' to drop. Thus the interval between the release of the hook H from the upper edge of the bar J by the dropping of the lower shutter and the final release of said hook from the strip L below said edge to allow the upper shutter to follow the first will be determined by the distance of the hook from the end of the strip as the latter moves inward when the bar J is released, and this distance is determined and adjusted at pleasure by drawing the bar J outward more or less. To indicate the interval thus secured between the falling of the lower shutter B and the upper shutter B', which will determine the interval of exposure or time during which the lens-opening is allowed to remain uncovered, a scale may be marked upon the outwardly-projecting end of the bar J, whose intervals will agree with the distance between the notches $n\ n$ on the upper edge of said bar, by which the position of the timing-strip L with reference to the hook is determined.

In making ready for an exposure with the device thus simply constructed the shutters B B' are lifted by a movement of the setting-lever E until the lower shutter B is engaged by the catch F and the upper shutter B' simultaneously secured by the engagement of the hook H with the upper edge of the timing-bar J. This may be done after a plate had been inserted in readiness for exposure, since the shutters, moving up together with an overlapping joint, effectually exclude the light even while this change is made in their position. If, after the shutters are thus raised, a time-exposure is to be made, the timing-bar J is drawn outward to its full extent, and is then secured by means of a pivoted latch P, which is adapted to swing over into a notch $r$ cut in the upper edge of the bar J, so that when by pushing in the button S on the outer end of the push-rod G the lower shutter B is released and drops to uncover the lens-opening, and the finger on the rod K is thereby made to operate to disengage the hook H from the rod J, the disengaged hook will catch upon the strip L beneath it, and by its engagement with said strip keep the upper shutter B' raised until such time as the operator by raising the latch P releases the timing-bar J. When this is done, the spring M will come into play to draw in the bar and carry the strip L back from the hook, and this movement will allow the upper shutter to drop upon the lower shutter, and so close the lens-opening and terminate the exposure. If after raising and thus setting the shutters in manner as described an instantaneous exposure be desired, the timing-bar J is not moved, and hence when the lower shutter is released by a touch on the button S the hook H, disengaged thereby from the rod J, will pass clear of the retarding-strip L, so that the upper shutter will be free to follow the first so closely as to render the exposure practically instantaneous. This exposure may be automatically extended more or less by drawing the timing-bar J outward, so that the hook H will engage the first or one of the succeeding notches $n\ n$. The retarding-strip L will be thereby brought under the hook, so as to catch and detain it until the bar J has, under the stress of its spring M, moved inward after its release from the hook far enough to carry the end of the strip also back from under the hook meantime resting thereon.

I claim as my invention—

1. The combination, in a photographic camera, of the double shutters made to traverse automatically its lens-opening, separate catches for detaining each shutter, with one shutter in position to cover the opening and the second in readiness to follow and take the place of the first, and a device carried by the first shutter to release, by its movement in uncovering the opening, the catch detaining the second shutter, whereby the latter is freed to cover the opening, substantially in the manner and for the purpose herein set forth.

2. The combination, in a photographic camera, with a shutter arranged to move automatically over the lens-opening to close it, a catch to detain the shutter in its open position, and a movable device affording a hold for said shutter-catch, of a spring for retracting said device from the shutter-catch to release it and means, substantially as described, for detaining the catch-holding device against the stress of its spring and for releasing it, substantially in the manner and for the purpose herein set forth.

3. The combination, in a photographic camera, with the shutter adapted to cover its lens-opening, of an independent bar sliding transversely across the way in which the shutter moves, a rack formed upon said bar, a spring operating to retract the bar, a spring-actuated catch carried upon the shutter to engage the rack and prevent its movement under the stress of its spring when the shutter is opened, and a longitudinal offset upon the bar in position to be engaged by said catch when the latter is released from the rack and thereby hold the shutter open while the bar moves inward, all substantially in the manner and for the purpose herein set forth.

4. The combination, in a photographic camera, with two independent shutters B B', arranged to move together across its lens-opening, the one in contact with the other, so that when they are carried jointly to either extreme of their movement in either direction the one or the other shall cover said lens-opening, of a flange $w$, projecting from the one shutter over the proximate edge of the other, forming a light-proof joint between them, substantially in the manner and for the purpose herein set forth.

5. The combination, in a photographic camera, with two independent shutters B B', arranged to move together across its lens-opening, the one in contact with the other, so that when they are carried jointly to either extreme of their movement in either direction the one or the other shall cover said lens-opening, of the springs D D', actuating each shutter independently to move them both in the same direction, a lever E, adapted to move both jointly in the opposite direction, a catch F, adapted to detain them both when thus moved, and means, as a push-rod G, for releasing said catch, substantially in the manner and for the purpose herein set forth.

6. The combination, in a photographic camera, with two independent shutters B B', arranged to move together across its lens-opening, the one in contact with the other, so that when they are carried jointly to either extreme of their movement in either direction the one or the other shall cover said lens-opening, of the springs D D', actuating each shutter independently to move them both in the same direction, a lever E, adapted to move both jointly in the opposite direction, a catch F, adapted to detain them both when thus moved, means, as a push-rod G, for releasing said catch, a second spring-catch H, carried by the outer shutter B' and engaging an independent support to hold said shutter, and a tripping-rod K, carried by the inner shutter B to release the catch H by the movement of said inner shutter when released from the catch F, all substantially in the manner and for the purpose herein set forth.

In testimony whereof I have signed my name to this specification in the presence of two subscribing witnesses.

JOHN J. DOSSERT.

Witnesses:
A. N. JESBERA,
E. M. WATSON.